United States Patent
Li et al.

(10) Patent No.: US 9,573,229 B2
(45) Date of Patent: Feb. 21, 2017

(54) ASSEMBLING APPARATUS FOR WORKPIECES

(71) Applicants: SHENZHEN FUTAIHONG PRECISION INDUSTRY CO., LTD., Shenzhen (CN); FIH (HONG KONG) LIMITED, Kowloon (HK)

(72) Inventors: Ching-Chuan Li, New Taipei (TW); Zhen-Hua Zhang, Shenzhen (CN); Ming Li, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 34 days.

(21) Appl. No.: 14/567,808

(22) Filed: Dec. 11, 2014

(65) Prior Publication Data
US 2015/0189800 A1 Jul. 2, 2015

(30) Foreign Application Priority Data
Dec. 31, 2013 (CN) .......................... 2013 1 0747911

(51) Int. Cl.
*B23P 19/00* (2006.01)
(52) U.S. Cl.
CPC ............ *B23P 19/001* (2013.01); *B23P 19/002* (2013.01); *B23P 19/004* (2013.01); *B23P 19/007* (2013.01);
(Continued)
(58) Field of Classification Search
CPC ..... B23P 19/001; B23P 19/002; B23P 19/004; B23P 19/007; Y10T 29/53539; Y10T 29/53535; Y10T 29/53543; Y10T 29/53048; Y10T 29/53052; Y10T 29/53061
(Continued)

(56) References Cited

U.S. PATENT DOCUMENTS 3,852,865 A * 12/1974 Ragard ............. H05K 13/0053
29/56.6
4,209,898 A * 7/1980 Aoki ..................... B23P 21/004
198/345.3
(Continued)

FOREIGN PATENT DOCUMENTS

CN 103465005 A 12/2013

*Primary Examiner* — Christopher Besler
*Assistant Examiner* — Bayan Salone
(74) *Attorney, Agent, or Firm* — Zhigang Ma

(57) ABSTRACT

A assembling apparatus includes an electric cabinet, a manipulator, a conveying assembly, and a distribution assembly. The manipulator is controlled by the electric cabinet. The conveying assembly includes a vibration plate and a guide rail, the vibration plate is controlled by the electric cabinet. The distribution assembly includes a driving apparatus, a distribution board, and a connection board, the driving apparatus is directed by the electric cabinet, the guide rail is connected between the vibration plate and the connection board, and the distribution board is connected to the driving apparatus. The vibration plate conveys workpieces to the guide rail, the driving apparatus drives the distribution board to communicate with the connection board, the workpieces pass through the connection board and the distribution board, and the manipulator lifts the workpieces from the distribution board.

13 Claims, 6 Drawing Sheets

(52) U.S. Cl.
CPC ..... *Y10T 29/53048* (2015.01); *Y10T 29/53052* (2015.01); *Y10T 29/53061* (2015.01); *Y10T 29/53535* (2015.01); *Y10T 29/53539* (2015.01); *Y10T 29/53543* (2015.01)

(58) Field of Classification Search
USPC .................. 29/700, 703, 707, 709, 711, 712, 714, 29/720, 729
See application file for complete search history.

(56) References Cited

U.S. PATENT DOCUMENTS

| | | | | |
|---|---|---|---|---|
| 4,383,359 A * | 5/1983 | Suzuki | ...................... | B07C 5/02 29/712 |
| 4,995,157 A * | 2/1991 | Hall | ...................... | H05K 13/022 198/385 |
| 5,145,047 A * | 9/1992 | Terracol | ................. | B23Q 7/003 198/341.02 |
| 5,353,490 A * | 10/1994 | Kukuljan | ................ | B23P 21/00 29/564 |
| 5,539,975 A * | 7/1996 | Kukuljan | ............... | B23P 21/004 198/346.2 |
| 5,894,657 A * | 4/1999 | Kanayama | ......... | H05K 13/0069 29/721 |
| 6,104,965 A * | 8/2000 | Lim | ................. | G05B 19/41865 257/E21.525 |
| 6,208,908 B1 * | 3/2001 | Boyd | .................... | G06Q 10/087 198/349 |
| 7,464,803 B2 * | 12/2008 | Cashimere | ........... | B65G 47/086 198/389 |
| 7,628,264 B2 * | 12/2009 | Ehlert | .................. | B23Q 17/003 198/341.01 |
| 8,397,375 B2 * | 3/2013 | Mertens | .......................... | 29/711 |
| 8,403,387 B2 * | 3/2013 | Nakasugi | ............... | B25J 15/0009 269/900 |
| 9,027,231 B2 * | 5/2015 | Mimura | .................. | B23P 21/00 29/720 |
| 2009/0012642 A1 * | 1/2009 | Mertens | ................ | B23P 21/004 700/112 |
| 2011/0258847 A1 * | 10/2011 | Meisho | .................. | B23P 19/00 29/700 |
| 2013/0055560 A1 * | 3/2013 | Nakasugi | ................ | B23P 21/00 29/700 |

* cited by examiner

ASSEMBLING APPARATUS FOR WORKPIECES

FIELD

The subject matter herein generally relates to assembling apparatus, and particularly relates to a assembling apparatus for conveying multiple types of workpieces.

BACKGROUND

In assembly of electronic devices, such as mobile phones, multiple workpieces such as nuts usually need to be conveyed and clamped to components of the electronic devices.

BRIEF DESCRIPTION OF THE DRAWINGS

Implementations of the present technology will now be described, by way of example only, with reference to the attached figures.

DETAILED DESCRIPTION

Figure 1:
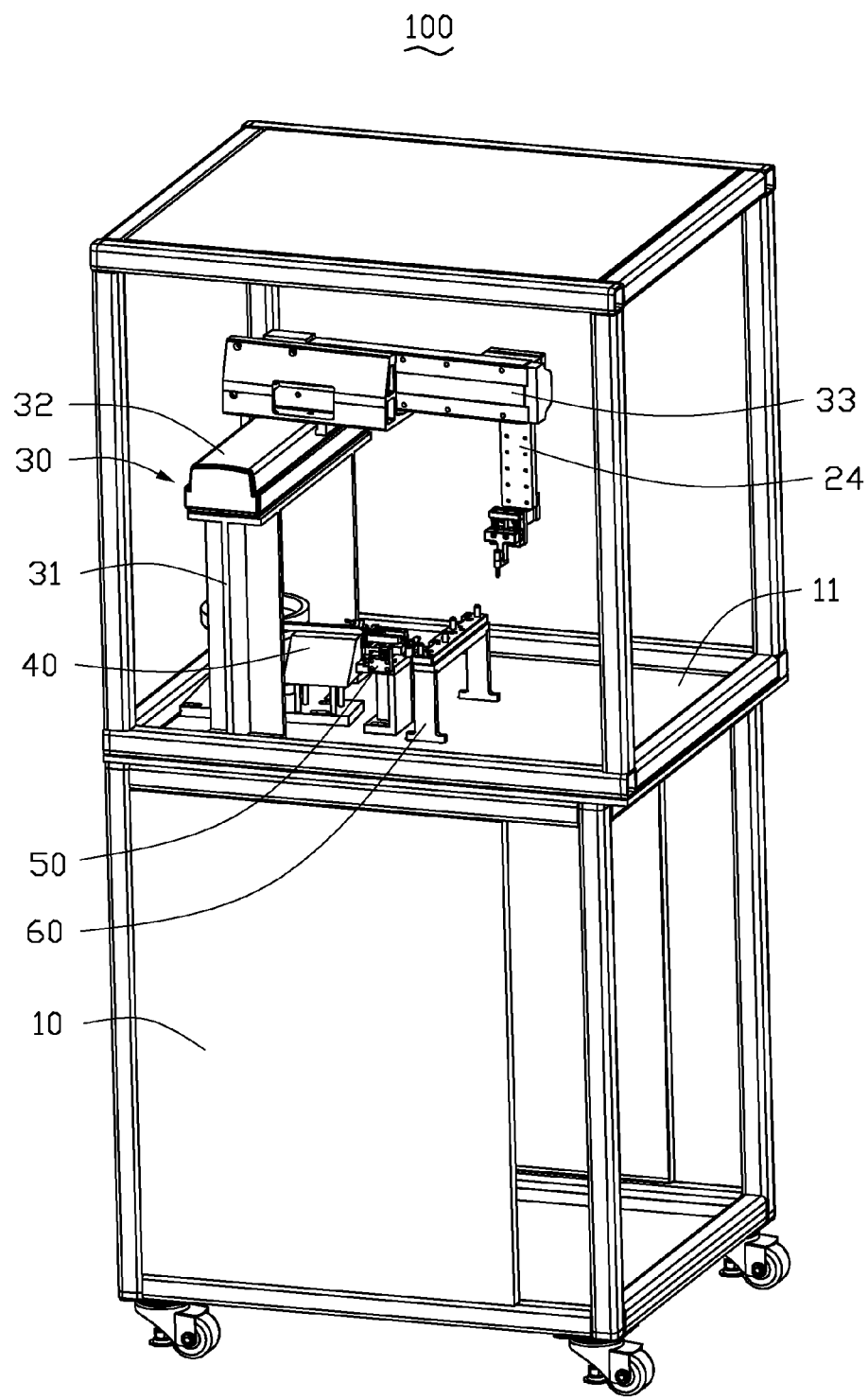
FIG. 1 is an assembled, isometric view of a assembling apparatus, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a assembling apparatus.

FIG. 1 illustrates an embodiment of a assembling apparatus 100, according to an exemplary embodiment. The assembling apparatus 100 is used to place multiple types of workpieces such as nuts on a fixture (not shown). The assembling apparatus 100 includes an electric cabinet 10, a manipulator 30, a conveying assembly 40, a distribution assembly 50, and a fixing frame 60.

The electric cabinet 10 may be a controller (for example, a computer controller) and includes a supporting board 11. The manipulator 30, the conveying assembly 40, the distribution assembly 50, and the fixing frame 60 are fixed on the supporting board 11. The fixing frame 60 is positioned opposite to the distribution assembly 50 and secures the fixture.

Figure 2:
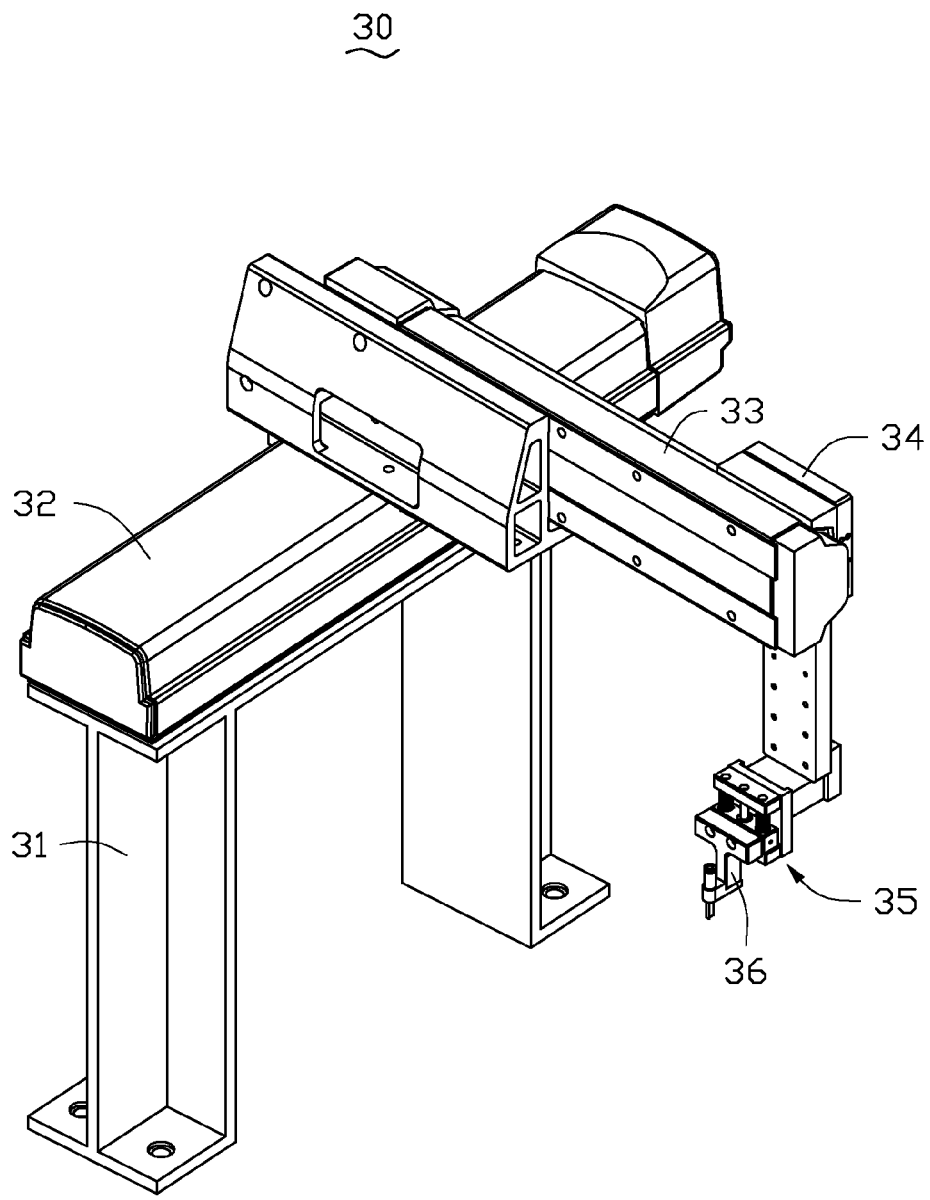
FIG. 2 is an assembled, isometric view of a manipulator of the assembling apparatus of FIG. 1.

FIG. 2 illustrates that the manipulator 30 can be a three axis manipulator. The manipulator 30 is controlled by the electric cabinet 10 and is configured to vacuum-lift the workpieces from distribution assembly 50 to the fixture secured on the fixing frame 60. The manipulator 30 includes a bracket 31, a first rail 32, a second rail 33, a third rail 34, a buffering member 35, and a suction nozzle 36. The first rail 32 is mounted on the supporting board 11 via the bracket 31. The second rail 33 is slidably and perpendicularly mounted on the first rail 32. The third rail 34 is slidably and perpendicularly mounted on the second rail 33. The buffering member 35 is located at an end of the third rail 34, and is configured to absorb shock of the manipulator 30. The suction nozzle 36 is fixed to the buffering member 35 for vacuum-lifting the workpieces.

Figure 3:
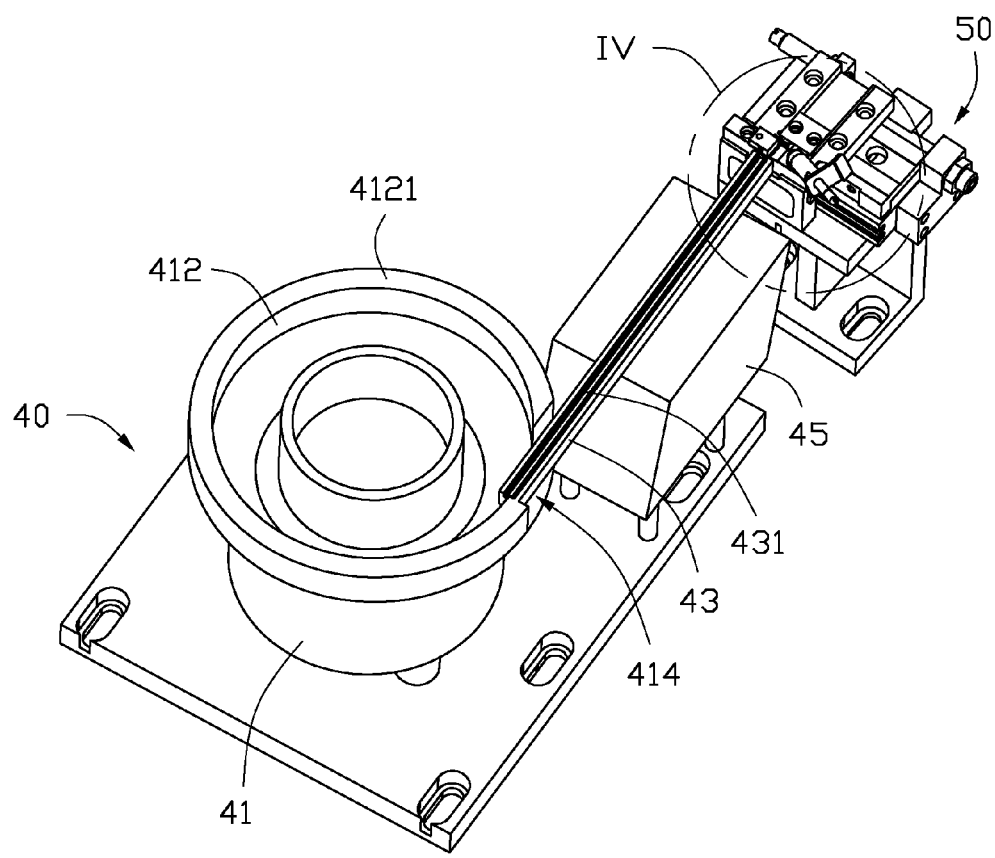
FIG. 3 is an assembled view of a conveying assembly and a distribution assembly of the assembling apparatus of FIG. 1.

FIG. 3 illustrates that the conveying assembly 40 is mechanically coupled to the distribution assembly 50, and is configured to convey the workpieces to the distribution assembly 50. The conveying assembly 40 includes a vibration plate 41, a guide rail 43, and a base 45. The vibration plate 41 and the base 45 are controlled by the electric cabinet 10 to vibrate under a predetermined frequency. The vibration of the vibration plate 41 conveys the workpieces to the guide rail 43. The vibration plate 41 includes a funnel 412 to receive the workpieces, and a peripheral wall 4121 of the funnel 412 defines an opening 414. A first end of the guide rail 43 passes through the opening 414, and a second end of the guide rail 43 is connected to the distribution assembly 50. In addition, the guide rail 43 defines a slot 431 communicating with the opening 414, and the base 45 is fixed to the guide rail 43. Thus, the base 45 can drive the guide rail 43 to vibrate synchronously to allow the workpieces to pass through the slot 431.

Figure 4:
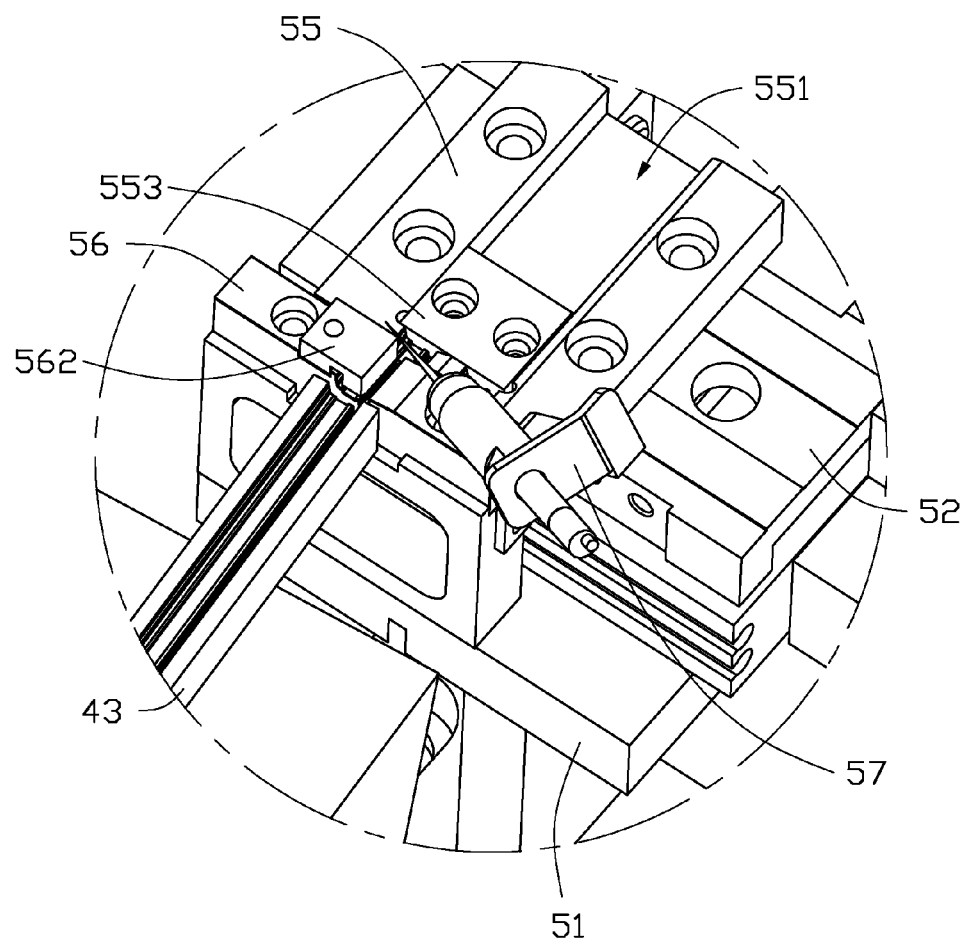
FIG. 4 is an enlarged, isometric view of circled portion IV shown in FIG. 3.
Figure 5:
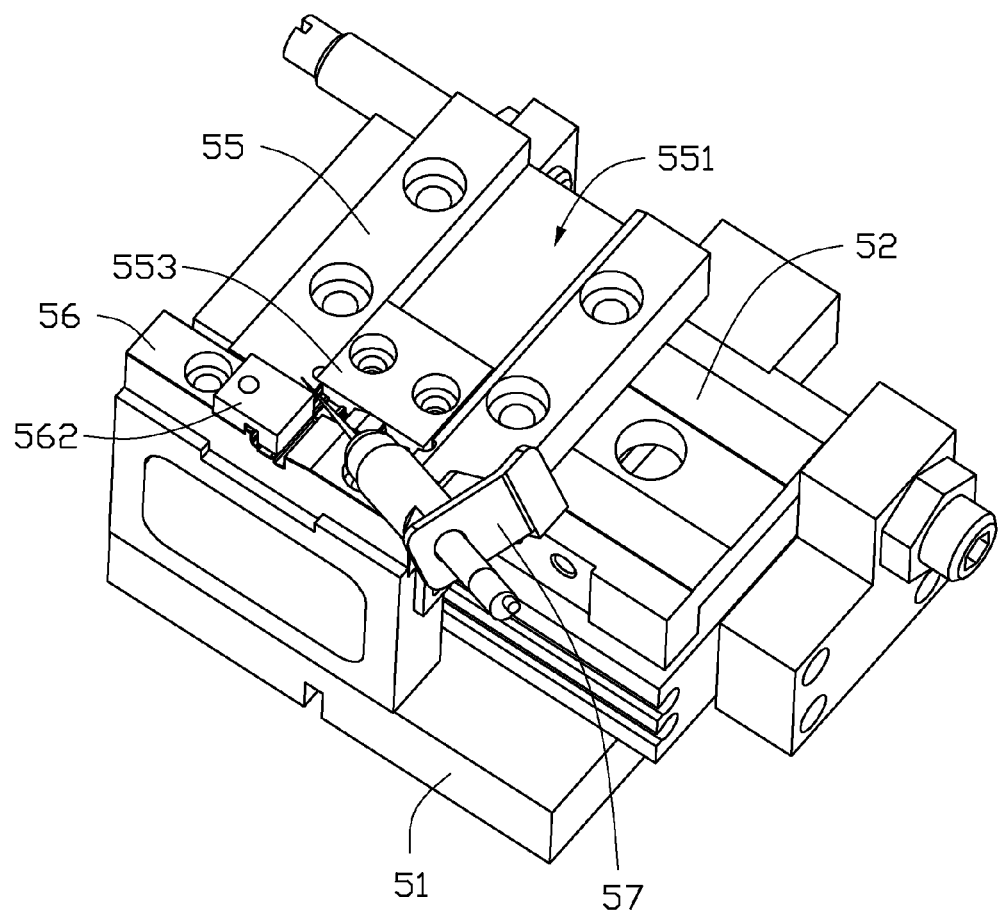
FIG. 5 is an assembled, isometric view of the distribution assembly of FIG. 3.
Figure 6:
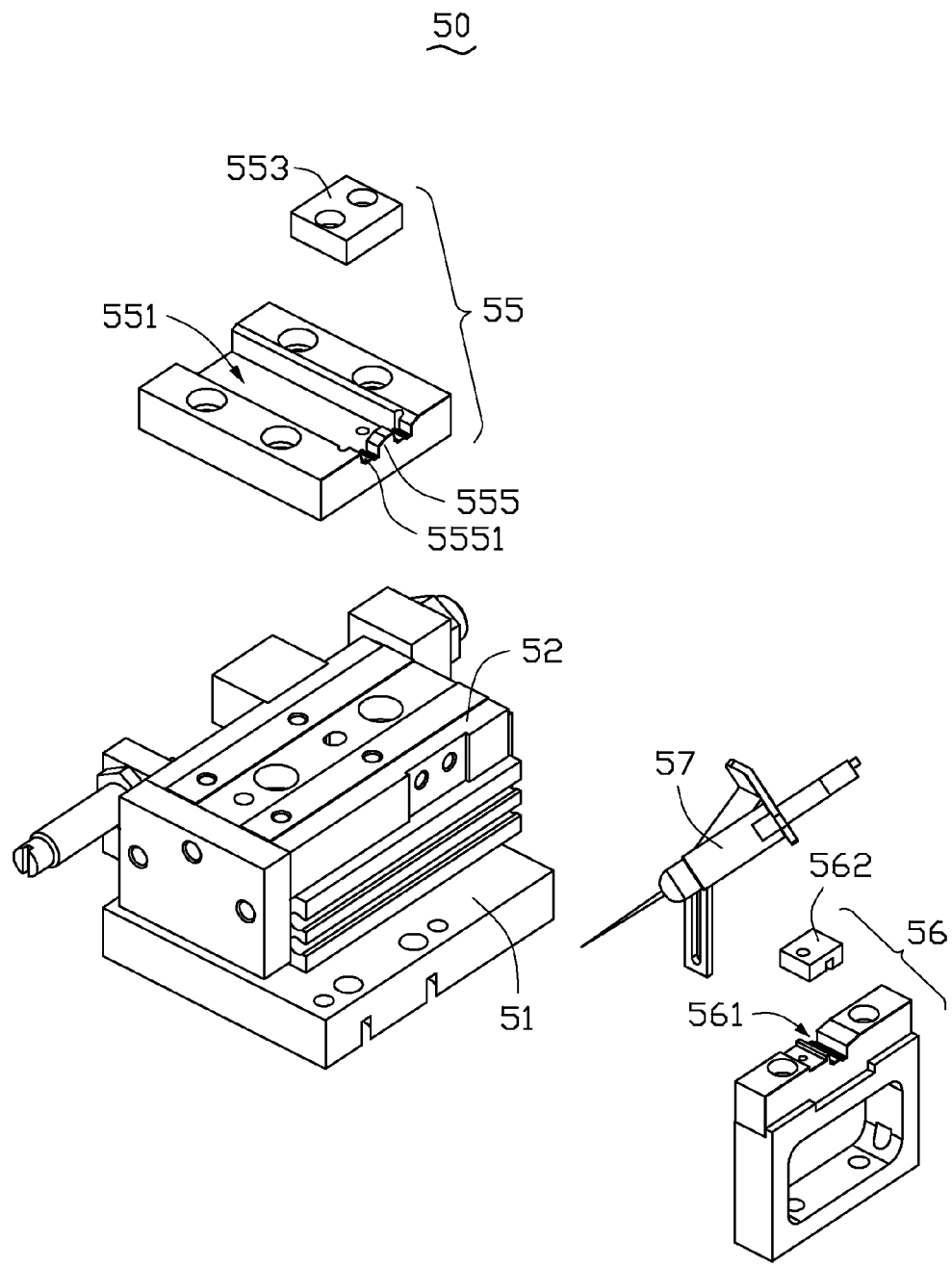
FIG. 6 is a partially exploded, isometric view of the distribution assembly of FIG. 5.

FIGS. 4-6 illustrate that the distribution assembly 50 is configured to output the workpieces. The distribution assembly 50 includes a mounting board 51, a driving apparatus 52, a distribution board 55, a connection board 56, and a sensor 57. The mounting board 51 is configured to secure the driving apparatus 52 and the connection board 56. In at least one embodiment, the driving apparatus 52 is a cylinder slidably mounted on the mounting board 51 and is directed by the electric cabinet 10. The distribution board 55 is connected to a side of the driving apparatus 52. Thus, the driving apparatus 52 can drive the distribution board 55 to move along the mounting board 51. The distribution board 55 forms an end wall 555; the end wall 555 defines two inlets 5551 to receive the workpieces. In addition, the distribution board 55 defines a guiding groove 511 communicating with the two inlets 5551, and a resisting member 553 is slidably mounted in the guiding groove 511 to protect the workpieces from sliding out of the guiding groove 511. The connecting board 56 is positioned opposite to the distribution board 55. The connecting board 56 defines a sliding groove 561, a first end of the sliding groove 561 communicates with the slot 431, and a second end of the sliding groove 561 selectively communicates with one of the two inlets 5551. Thus, the connecting board 56 can transmit the workpieces from the guide rail 43 to the distribution board 55 via the sliding groove 561. The connecting board 56 further forms a protrusion 562 adjacent to the sliding groove 561. The protrusion 562 engages the sliding groove 561 to protect the workpieces from reversing when the workpieces pass through the sliding groove 561. The sensor 57 is positioned at the connection board 56 and is aligned with one of the two inlets 5551. The sensor 57 is configured to determine whether the workpieces enter into the one of the two inlets 5551, and output a signal to the electric cabinet 10.

FIGS. 1-3 illustrate when in use, the workpieces are dumped into the funnel 412, the electric cabinet 10 is turned on to drive vibration plate 41 and the base 45 to vibrate. Thus, the workpieces may fall into the slot 431 from the funnel 412, and then the workpieces pass through the groove 561 and enter into the one of the two inlets 5551 communicating with the sliding groove 561.

When the sensor 57 determines that the workpieces enter into the one of the two inlets 5551 aligned with the sensor 57, the sensor 57 outputs a signal to the electric cabinet 10. Thus, the electric cabinet 10 controls the driving apparatus 52 to drive the distribution board 55 to move along the mounting board 51, and then another inlet 5551 is aligned with and communicates with the sliding groove 561. At this time, the workpieces can pass through the other inlet 5551.

Further, the manipulator 30 vacuum-lifts the workpieces from the two inlets 5551 via the suction nozzle 36, and then the workpieces are released from the suction nozzle 36 and are placed on the fixture.

In other embodiments, the end wall 555 of the distribution board 55 may be detachably mounted to the guiding groove 511. Thus, the end wall 555 can be changed according to different workpieces. In addition, the end wall 555 may define a plurality of inlets 5551 to allow the workpieces to quickly pass through the distribution assembly 50.

In summary, the assembling apparatus 100 includes a conveying assembly 40 conveying the workpieces to the distribution assembly 50, and the distribution assembly 50 outputs the workpieces to facilitate retrieval by the manipulator 30. Thus, the assembling apparatus 100 reduces the cost of production and the volume of working space. In addition, the distribution board 55 defines at least two inlets 5551 to improve the conveying speed.

The embodiments shown and described above are only examples. Many details are often found in the art such as the other features of the assembling apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A assembling apparatus comprising:
   an electric cabinet;
   a manipulator controlled by the electric cabinet;
   a conveying assembly comprising a vibration plate and a guide rail, the vibration plate controlled by the electric cabinet;
   a distribution assembly comprising a driving apparatus, a distribution board, and a connection board, the driving apparatus directed by the electric cabinet, the guide rail connected between the vibration plate and the connection board, and the distribution board connected to the driving apparatus;
   wherein the vibration plate is configured for conveying workpieces to the guide rail, the driving apparatus is configured for driving the distribution board to communicate with the connection board so that the workpieces pass through the connection board and the distribution board, and the manipulator is configured for lifting the workpieces from the distribution board;
   wherein the distribution board defines at least two inlets and a guiding groove communicating with the two inlets, and a resisting member is slidably mounted in the guiding groove to protect the workpieces from sliding out of the guiding groove.

2. The assembling apparatus as claimed in claim 1, wherein the vibration plate comprises a funnel to receive the workpieces, the funnel defines an opening, and the guide rail passes through the opening.

3. The assembling apparatus as claimed in claim 2, wherein the conveying assembly further comprises a base controlled by the electric cabinet and fixed to the guide rail, the guide rail defines a slot communicating with the opening, and the base drives the guide rail to vibrate to allow the workpieces to pass through the slot.

4. The assembling apparatus as claimed in claim 1, wherein the connecting board defines a sliding groove, a first end of the sliding groove communicates with the slot, and a second end of the sliding groove selectively communicates with one of the at least two inlets.

5. The assembling apparatus as claimed in claim 1, wherein the connecting board forms a protrusion adjacent to the sliding groove, the protrusion engages the sliding groove to protect the workpieces from reversing.

6. The assembling apparatus as claimed in claim 1, wherein the distribution assembly further comprises a sensor positioned at the connection board and aligned with one of the two inlets, the sensor determines whether the workpieces enter into the one of the two inlets, and outputs a signal to the electric cabinet.

7. A assembling apparatus comprising:
   an electric cabinet;
   a manipulator controlled by the electric cabinet;
   a conveying assembly;
   a distribution assembly comprising a driving apparatus, a distribution board, and a connection board, the driving apparatus directed by the electric cabinet, the connection board connected to the conveying assembly and defining at least two inlets and a sliding groove, and the distribution board connected to the driving apparatus and defining a guiding groove communicating with one of the at least two inlets;
   wherein the conveying assembly is configured for conveying workpieces to the groove, the distribution assembly further comprises a sensor aligned with the one of the two inlets communicating with the guiding groove, the sensor determines whether the workpieces enter into the one of the two inlets, and outputs a signal to the electric cabinet; and
   wherein the electric cabinet is configured for controlling the drive apparatus, according to the signal, to move the distribution board to allow another one of the at least two inlets to communicate with the sliding groove, and the manipulator is configured for lifting the workpieces from the distribution board;

wherein the connecting board forms a protrusion adjacent to the sliding groove, the protrusion engages the sliding groove to protect the workpieces from reversing.

8. The assembling apparatus as claimed in claim 7, wherein the conveying assembly comprises a vibration plate and a guide rail, the vibration plate is controlled by the electric cabinet, the vibration plate comprises a funnel to receive the workpieces, the funnel defines an opening, and the guide rail passes through the opening.

9. The assembling apparatus as claimed in claim 8, wherein the conveying assembly further comprises a base controlled by the electric cabinet and fixed to the guide rail, the guide rail defines a slot communicating with the opening, and the base drives the guide rail to vibrate to allow the workpieces to pass through the slot.

10. The assembling apparatus as claimed in claim 9, wherein the distribution board forms an end wall, the at least two inlets are defined at the end wall.

11. The assembling apparatus as claimed in claim 10, wherein a first end of the sliding groove communicates with the slot, and a second end of the sliding groove selectively communicates with one of the at least two inlets.

12. The assembling apparatus as claimed in claim 7, wherein the manipulator comprises a bracket a first rail, a second rail, a third rail, a buffering member, and a suction nozzle, the first rail is mounted on the electric cabinet via the bracket, the second rail is slidably mounted on the first rail, the third rail is slidably mounted on the second rail, the buffering member is located at an end of the third rail, and the suction nozzle is fixed to the buffering member for vacuum-lifting the workpieces.

13. An assembling apparatus comprising:
a manipulator;
a conveying assembly with a vibration plate and a guide rail;
a distribution assembly with a driving apparatus, a distribution board and a connecting board; and
a controller;
wherein, the controller controls the manipulator, the conveying assembly, and the driving apparatus;
wherein, the guide rail connects the vibration plate and the connecting board and the distribution board is connected to the driving apparatus;
wherein, the vibration plate and the guide rail are configured for selectively conveying workpieces to the distribution assembly; and
wherein, the driving apparatus is configured for moving the distribution board to communicate with the connecting board so that the workpieces move along the connecting board and the distribution board to be lifted from the distribution board by the manipulator;
wherein the distribution board defines at least two inlets and a guiding groove communicating with the two inlets, and a resisting member is slidably mounted in the guiding groove to protect the workpieces from sliding out of the guiding groove.

* * * * *